July 13, 1965 J. T. FISCHBACH ETAL 3,194,377
GROCERY CART STORAGE AND DISPENSER DEVICE
Original Filed Aug. 12, 1959 4 Sheets-Sheet 1

INVENTORS
JACK T. FISCHBACH
KENNETH B. HARRISON
By STEVENS, DAVIS, MILLER & MOSHER
ATTORNEYS

July 13, 1965   J. T. FISCHBACH ETAL   3,194,377
GROCERY CART STORAGE AND DISPENSER DEVICE
Original Filed Aug. 12, 1959                              4 Sheets-Sheet 2

INVENTORS
JACK T. FISCHBACH
KENNETH B. HARRISON
By STEVENS, DAVIS, MILLER & MOSHER
ATTORNEYS

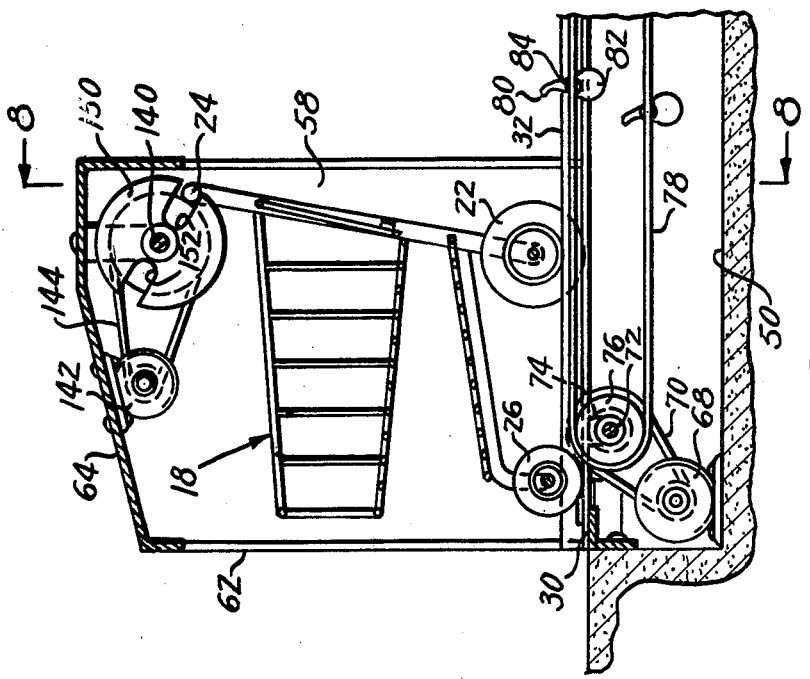
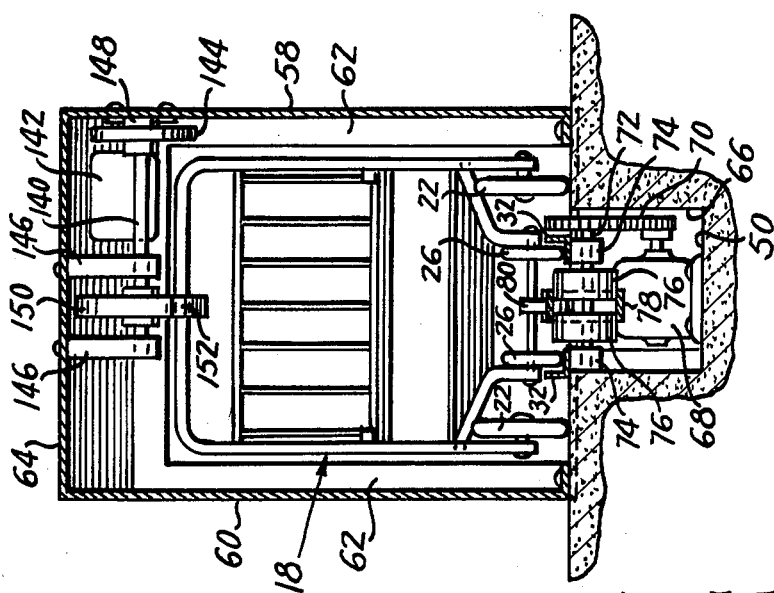

July 13, 1965   J. T. FISCHBACH ET AL   3,194,377
GROCERY CART STORAGE AND DISPENSER DEVICE
Original Filed Aug. 12, 1959   4 Sheets-Sheet 4
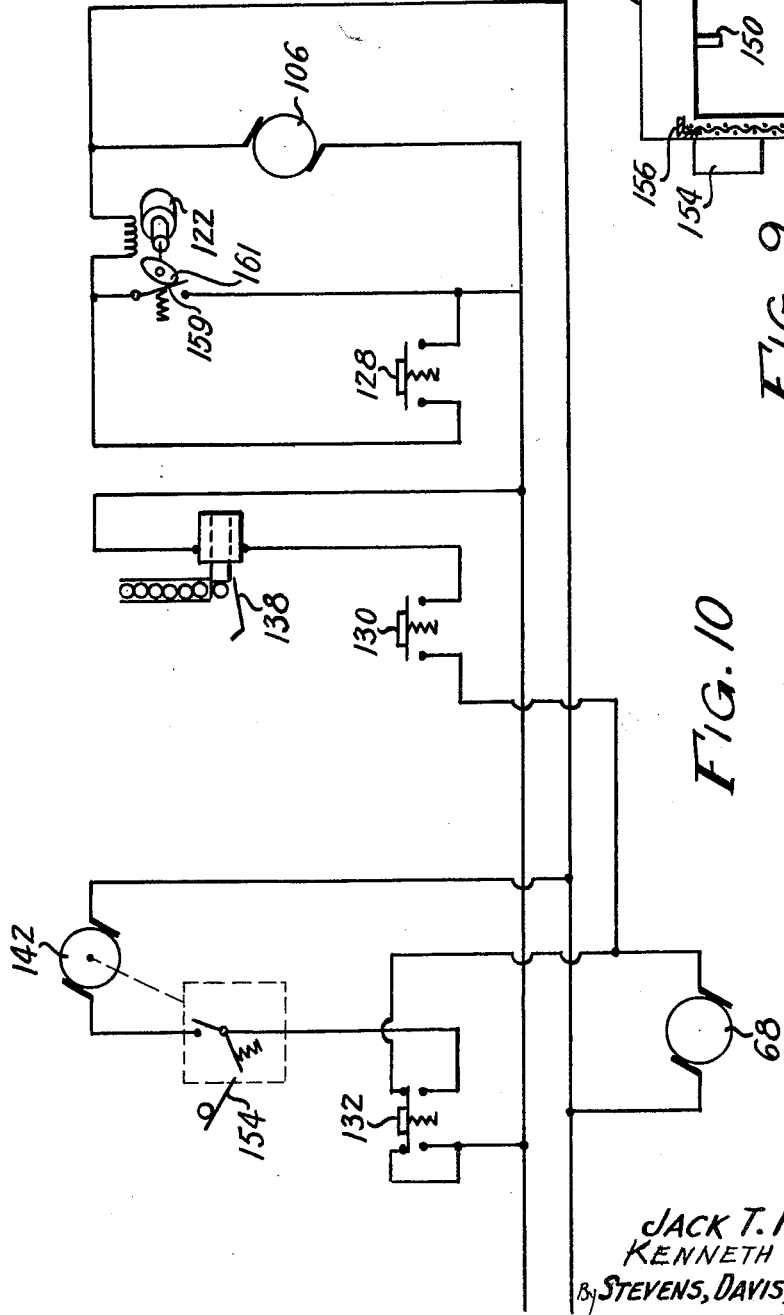
INVENTORS
JACK T. FISCHBACH
KENNETH B. HARRISON
By STEVENS, DAVIS, MILLER & MOSHER
ATTORNEYS

United States Patent Office

3,194,377
Patented July 13, 1965

3,194,377
GROCERY CART STORAGE AND DISPENSER
DEVICE
Jack Tillar Fischbach, 3831 Beech Ave., and Kenneth B.
Harrison, 3103 Keswick Road, both of Baltimore, Md.
Continuation of application Ser. No. 833,304, Aug. 12,
1959. This application Feb. 14, 1963, Ser. No. 259,481
8 Claims. (Cl. 194—4)

The present invention generally relates to a novel and improved structural arrangement for storing and dispensing grocery carts such as those normally employed within grocery stores by the customer when collecting desired articles and then transporting these articles to a loading station or to his automobile. This application is a continuation of application, Serial Number 833,304, filed August 12, 1959, and now abandoned.

In present day supermarkets and similar establishments, there is often provided a plurality of wheeled carts generally known as grocery carts for use by the customer while selecting the articles he desires after which the articles are placed in the cart and when all of the articles have been obtained, the cart is rolled to a check-out station where the cost of the articles is totaled and the articles are paid for. The articles are then placed back into the grocery cart, usually in a bag, and the grocery cart is pushed outside to the parking area where the customer loads the articles into his automobile. The grocery carts are then returned to the building or a central collection point where they are subsequently gathered and returned to the building for re-use. Under this procedure, it has been found that a considerable number of these grocery carts are lost, damaged or stolen and the repair and replacement of grocery carts has become an article of considerable expense and overhead in the operation of the store. There have been several attempts to solve the problem. In certain installations, the grocery carts are pushed out of the store by the customer to a loading area where the cart and the articles are left in the charge of a custodian with the customer obtaining a claim check. The customer then goes to his automobile and drives it to the loading station and loads the bags or articles from the cart into his automobile usually with the assistance of the person or persons in charge of the loading station. This, of course, has cut down on the overhead but has required the services of additional employees, a claim check arrangement and, more importantly, has quite often created dissatisfaction since the customers quite often have mistakenly obtained the wrong articles from the loading station, thus leading to much confusion and dissatisfaction. Another solution has been the provision of a conveyor arrangement which conveys the articles to a central loading station so that the customer may pick up the articles at the central loading station, and in this orientation, the carts never leave the interior of the store. This solution, of course, requires expensive conveying machinery along with its upkeep and other objectionable features such as unsightliness and utilization of otherwise useful space.

While the above solutions to the problem and others have somewhat alleviated the problem, they have been found to be objectionable or impracticable in some way or another. Therefore, it is the primary object of the present invention to provide a grocery cart storage and dispensing device which will store the grocery carts generally in a concealed manner and includes a structural arrangement that will dispense a single grocery cart to a customer when the customer places a coin in a coin operated control device so that the customer may then take the grocery cart, gather the articles desired, proceed through the check-out station and then subsequently to the parking lot for loading the articles into his automobile. The grocery cart need only be returned to one of the storage or dispenser devices of the present invention and inserted into the storage and dispenser device whereupon the coin or a coin of equivalent value will be returned to the customer.

In actual practice, it has been found that coins of relatively small denominations are suffifficient to materially reduce the removal of grocery carts from the premises since most removals are not actual thefts but inadvertent removals. Thus, if a customer has invested a sum of money even though it be a small sum, he will most likely recover this sum by returning the grocery cart to the storage and dispenser device. It is pointed out that it is not necessary to return the cart to the same storage and dispenser device, thus enabling a plurality of the devices to be strategically located for easy access by the customers.

Another object of the present invention is to provide a grocery cart storage and dispensing device including a mechanism for moving the baskets into the storage device with it only being necessary for the customer to merely push the forward end of the cart slightly into the storage and dispensing device.

Yet another object of the present invention is to provide a grocery cart storage and dispensing device which will positively retain the carts in position and will discharge a single cart from the discharge end when a coin is deposited and will discharge a single coin of the same denomination when a cart is returned to the storage device.

Yet another feature of the present invention is to provide a grocery cart storage and dispensing device which is simple in construction, safe, foolproof, easy to install, easy to use and generally inexpensive to manufacture and maintain.

The foregoing and other objectives, advantages, and features of construction will become aparent from a consideration of the following description and the appended drawings.

FIGURE 7 is a longitudinal, vertical sectional view taken substantially upon a plane passing along section line 7—7 of FIGURE 3 illustrating further structural details of the exit or discharge end of the device;

FIGURE 8 is a transverse, vertical sectional view taken substantially upon a plane passing along section line 8—8 of FIGURE 7 illustrating the orientation of the grocery cart and the storage and dispenser at the discharge end thereof;

Figure 1:
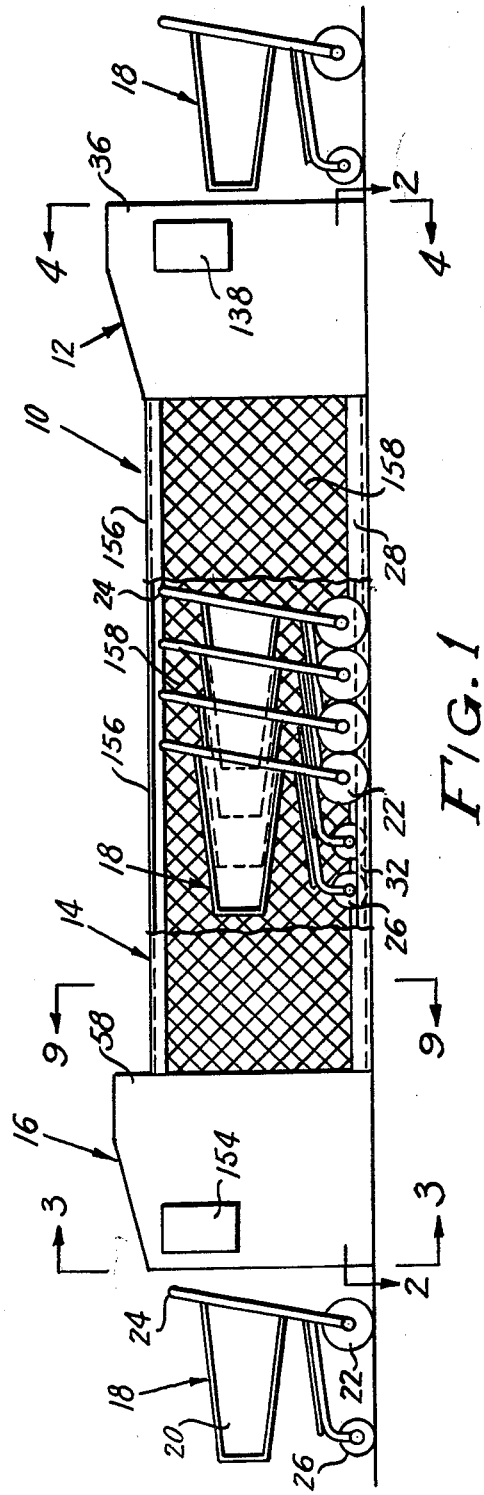
FIGURE 1 is a side elevational view of the grocery cart storage and dispensing device of the present invention with a portion of the side wall broken away illustrating the orientation of the grocery carts within the device in showing one grocery cart leaving the device and another grocery cart approaching the entrance end thereof.

FIGURE 9 is a transverse, vertical sectional view taken substantially upon a plane passing along section line 9—9 of FIGURE 1 illustrating the structural details of the intermediate portion of the device; and FIGURE 10 is a schematic wiring diagram illustrating the orientation and relationship of the coin controlled mechanism, the coin discharge mechanisms and the interlocking switches for controlling operation of the device.

Referring now specifically to the drawings, the numeral 10 generally designates the grocery cart storage and dispensing device of the present invention which, for the purposes of identification, include an entrance or ingress end 12, an elongated central portion generally designated by numeral 14 and an exit portion or area 16 from which the grocery carts emerge. The grocery carts are generally designated by numeral 18 and are of conventional construction and briefly include a tapered basket 20 for nesting with forward and rearwardly disposed carts together with supporting wheels 22 with the wheels being either of the caster type or of the rigid axle type. The basket 18 is also provided with the usual transverse handle 24 by which the customer manipulates the basket in the usual manner. In the conventional baskets, the front wheels 26 are usually closer together and smaller than the rear wheels 22.

Extending throughout the length of the device is a pair of side rails 28 conveniently in the form of elongated angle iron members which are interconnected by transverse end frame members 30. Disposed inwardly of and parallel to the side rails 28 is a pair of angle iron guide rails 32 which have their ends connected to the cross members 30. The angle iron members 32 have the entrance end thereof outwardly flared as indicated by numeral 34 for guiding the front wheels 26 of a grocery cart onto the upper surface of the horizontal flanges of the right angle members 32 whereby the upright flanges of the right angle members 32 guide and retain the front wheels of the cart therein. The rear wheels 22 of the cart are disposed between the right angle members 32 and the right angle members 28 as illustrated in FIGURE 8.

The rear portion 12 includes a pair of side panels 36 having one end edge connected to a corner post or member 38 and the other end edge connected to an upright 39. The top edges of the panels 36 are interconnected by a roof member 40 and the rear edges of the side panels 36 are interconnected by a partial top panel 42 thus leaving an enlarged opening 44 for entrance of the carts 18. The other end edges of the panels 36 are connected by relatively short panel 46 defining an enlarged opening 48 through which the carts 18 may egress.

Disposed in an elongated trough 50 in a concrete base 52 is a conveying chain 54 having a plurality of upwardly extending projections 80 thereon which project up and engage the front axles of grocery carts 18 for moving the grocery carts inwardly of the device 10.

The exit portion 16 of the device includes side panels 58 and 60 supported by end flanges 62 and provided with a roof 64 which forms a housing for the carts as they proceed out of the device.

At the discharge end, the trough 50 is laterally enlarged as at 66 and has a motor 68 therein with a V-belt drive 70 or the like which V-belt drive or sprocket chain drive rotates a transverse shaft 72. The shaft 72 is supported on bearing blocks 74 suspended from the rails 32 and a pair of pulleys 76 are fixed to the shaft 72 for rotation therewith and these pulleys 76 receive an elongated endless flexible belt 78 which has parallel upper and lower runs with the lower run being received within the trough 50 and the upper run being disposed intermediate the horizontal flanges of the guide rails 32.

The belt 78 is provided with a plurality of longitudinally spaced hook shaped members or projections 80 which have a counterpoise 82 on the lower end thereof and which is hingedly attached to the belt 78 generally at the vertical center thereof with the pivot pin being indicated by numeral 84.

The other end of the belt 78 is supported by a pulley 86 carried on a shaft 88 which is supported from the frame rails 32 by suitable bearing blocks and the shaft 88 also carries a pair of pulleys 90 which are in alignment with a pair of longitudinally spaced pulleys 92 adjacent the flared ends 34 of the rails 32. The pulleys 92 are supported on a transverse shaft 94 supported by bearing blocks 96 and extending outwardly into a laterally enlarged area 98 of the trough 50 with the outer end of the shaft 94 being supported by a bearing block 100 carried by the side wall 36. The shaft 94 is provided with a drive pulley or sprocket 102 thereon which is engaged with a V-belt or chain drive 104 driven from an electric motor 106 disposed within a housing 108 disposed exteriorly of the casing 12 with the shaft extending through an opening 112 in the wall 36. The other end of the motor 106 is provided with a drive pulley or gear 114 driving a V-belt or sprocket chain 116 which is in meshing engagement with a shaft 118 which extends inwardly and transversely of the cabinet like member with the shaft 118 having support bearing block 162 attached to housing 108 and having clutch 122 mounted at its externally projecting end arranged so that upon being energized by switch 128 the motion of driving belt or chain 116 is coupled to shaft 164 and disc 124. Shaft 164 extends inwardly and transversely of the cabinet like member having bearing blocks 120 and 163. On shaft 164 intermediate of bearing blocks 120 is a receiving disc 124 having a pair of diametrically opposed notches 126 therein which receive the grocery cart handle 24 and which will move cart handle 24 inwardly when disc 124 is rotated.

Figure 2:
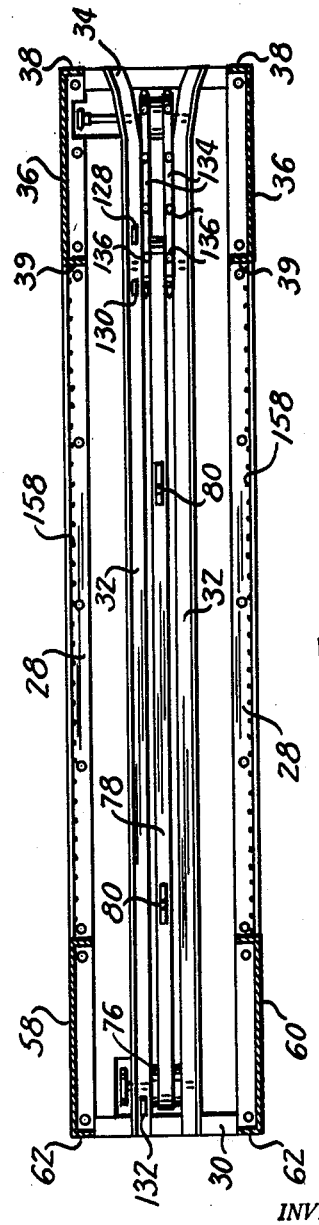
FIGURE 2 is a longitudinal, plan sectional view taken substantially upon a plane passing along section line 2—2 of FIGURE 1 illustrating the grocery cart propelling mechanism and track mechanism for guiding the carts.
Figure 3:
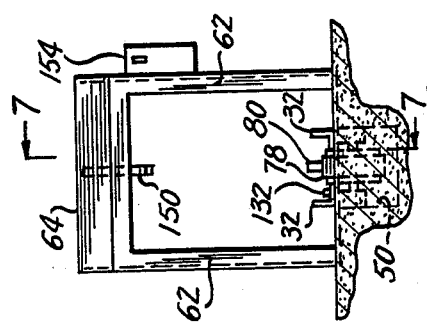
FIGURE 3 is a discharge end elevational view taken substantially upon a plane passing along reference line 3—3 of FIGURE 1 illustrating the relationship of the components of the discharge end of the dispenser and storage device.
Figure 4:
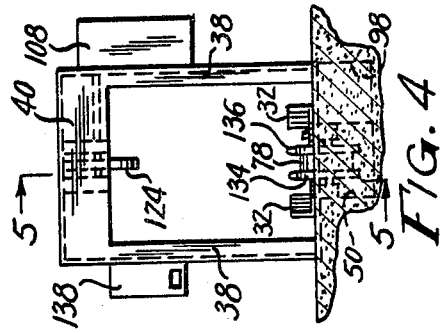
FIGURE 4 is an entrance end elevational view taken substantially upon a plane passing along section line 4—4 of FIGURE 1 illustrating the structural details of the entrance end of the device.
Figure 5:
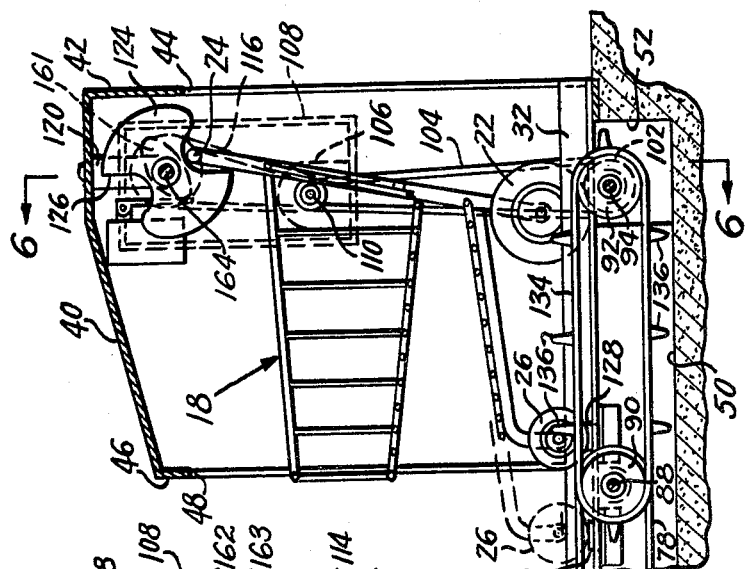
FIGURE 5 is a longitudinal, vertical sectional view taken substantially upon a plane passing along section line 5—5 of FIGURE 4 illustrating further structural details of the entrance end of the device.
Figure 6:
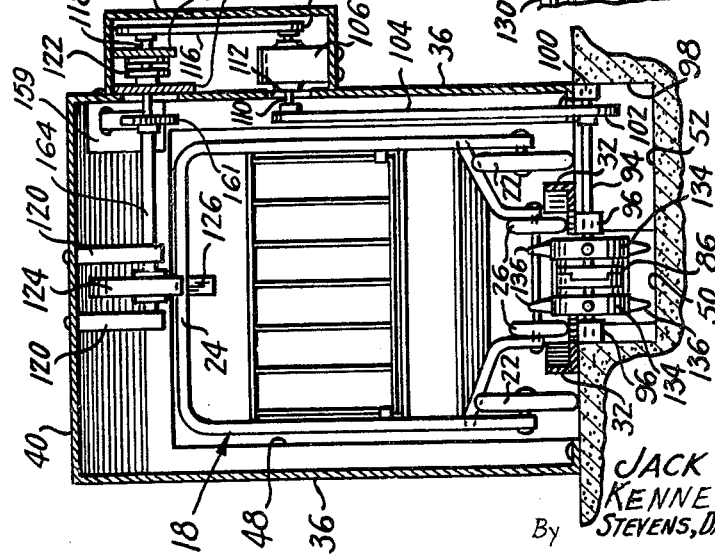
FIGURE 6 is a transverse, vertical sectional view taken substantially upon a plane passing along section line 6—6 of FIGURE 5 illustrating further structural details of the entrance end of the device.

In FIGURE 2, it is noted that there are three switches designated by numerals 128, 130 and 132. Switch 128 controls clutch 122 for operating intake disc 124. Cam 161 fixed to shaft 164 operates switch 159 to keep clutch 122 engaged while disc 124 is moving cart 18 inwardly. Diametrically opposed notches 126 on disc 124 thus serve to allow only one cart at a time to be received into the machine from the continuously moving conveyor belts 134 which position the cart wheels 26 so as to operate switch 128, and the cart handle 24 into notch 126 in disc 124.

Disposed longitudinally inwardly from the switch 128 is a switch 130 which operates a coin discharge mechanism generally designated by numeral 138 to signify return of the grocery cart. Switch 130 also momentarily energizes motor 68 causing operation of conveyor 78 which moves cart 18 inwardly to the nesting area and clear of the ingress end 12.

Thus, as a grocery cart 18 proceeds into the storage and dispensing device, the cart will be picked up by the disc 124 and moved forwardly sufficiently aided by the flexible projections 136 on member 134 and moved onto the tracks formed by the guides 32 wherein the hook shaped projections 80 on member 78 engage the axle of the carts and carry them until they are nested with the rearmost cart. When the rearmost cart is nested, the hook shaped member 80 will swing about the pivot point 84 and pass the axles thus allowing the hook shaped members to pass under the axle. Inasmuch as the hook shaped members 80 will move the baskets to the discharge end at any time switch 132 is not depressed by the presence of a cart in the proper position for ejection (note added wiring to accomplish this on FIGURE 10), the discharge structure will always have a basket available if there are any baskets at all in the storage and dispensing device.

Extending transversely under the roof panel 64 is a shaft 140 driven by a motor 142 by suitable drive belt or chain 144 and the shaft 140 is supported by bearing brackets 146 and bearing blocks 148. Mounted on the shaft 140 between the bearing blocks 146 is a disc 150 having a pair of diametrically opposed generally U-shaped radially extending notches 152 for receiving the handle 24 of the grocery cart so that the grocery cart 18 will be projected out of the discharge portion 16 when the motor 142 is energized. The motor 142 is energized by a coin control switch assembly 154 and also the switch 132 so that the motor will not operate unless both the pressure switch 132 in the guideway 32 and the coin control switch assembly 154 is in closed position which indicates that a cart is ready for dispensing and a coin has been deposited.

The intermediate portion 14 of the device includes top side rails 156 which rails are interconnected with the bottom side rails 28 by screen member 158.

In operation, a customer desiring a grocery cart deposits a coin in the coin receiving mechanism which closes a coin operated switch 154 which will operate motor 142, if the interlock 132 is closed, to operate the dispensing disc 150 to eject a single basket and disc 150 will stop in alignment with the next basket handle. When a customer approaches the entrance end, the basket 18 is rolled into the trackway formed by the guide rails 32, the switch 128 is closed which operates the magnetic clutch 122 so that the power from the continuously operating motor 106 will be transmitted to the disc 124 and conveyor 134 for injecting the cart into the storage and dispensing device wherein it hits the switch 130 and operates the coin discharge mechanism. In FIGURE 10 switch clutch 122 operates until disc 124 is in position to receive the next incoming cart.

While this invention has been described in a specific form and as operating in a specific manner for the purpose of illustration, it is to be understood that the invention is not limited thereto, since various modifications will suggest themselves to those skilled in the art without departing from the spirit of this invention, the scope of which is set forth in the annexed claims:

What is claimed is:

1. A grocery cart storage and dispensing device comprising an elongated housing structure, guide means extending throughout the housing for guiding movement of carts through the housing, means disposed within the housing for conveying and positioning grocery carts from one end to the other thereof to be available for dispensing, dispensing means at one end of the housing for discharging a single cart in response to deposit of a coin, and means at the other end of the housing for receiving one cart at a time, and means connected to the cart receiving means for discharging a coin of equal value to the coin deposited at the dispensing end of the housing, said means for conveying the grocery carts including an elongated endless belt conveyor, hook shaped members pivotally attached to the conveyor, and counterpoises on the hook shaped members for gravitationally urging the hook shaped members into upstanding position thereby permitting the hook shaped members to pass under the grocery carts when the grocery carts are prevented from moving in the housing.

2. A grocery cart storage and dispensing device comprising an elongated housing structure, guide means extending throughout the housing for guiding movement of carts through the housing, means disposed within the housing for conveying and positioning grocery carts from one end to the other thereof to be available for dispensing, dispensing means at one end of the housing for discharging a single cart in response to deposit of a coin, and means at the other end of the housing for receiving one cart at a time, and means connected to the cart receiving means for discharging a coin of equal value to the coin deposited at the dispensing end of the housing, said means at the dispensing end of the housing including a rotatable notched disc for receiving the handle of a grocery cart, a motor for driving said disc, a coin controlled switch for connecting the motor with a power source, and an interlocking switch engageable by the cart and connecting the motor and coin switch to the source of power whereby the motor and coin switch will operate only when a cart is present.

3. A grocery cart storage and dispensing device comprising an elongated housing structure, guide means extending throughout the housing for guiding movement of carts through the housing, each of the carts having a handle bar means disposed within the housing for conveying and positioning grocery carts from one end to the other thereof to be available for dispensing, dispensing means at one end of the housing for discharging a single cart in response to deposit of a coin, and means at the other end of the housing for receiving one cart at a time, and means connected to the cart receiving means for discharging a coin of equal value to the coin deposited at the dispensing end of the housing, means for injecting a single cart at a time into the storage and dispensing device comprising a rotating disc having notches therein for engaging the handle bar, and means operating the coin return mechanism in response to rotation of the disc which returns coins of equal value to those previously deposited.

4. A grocery cart storage and dispensing apparatus comprising housing means for receiving and nesting a plurality of grocery carts, coin operated means at one end of said housing for discharging a grocery cart to a customer in response to deposit of a coin, means at the other end of said housing for discharging a coin in response to movement of a returned grocery cart into the housing, and means for conveying and guiding the grocery carts from the intake end of the housing to the discharge end thereof comprising a longitudinal conveyor belt having projections thereon for engagement with the axles of the carts, longitudinally extending parallel ridges forming trackways for guiding the movement of the carts, said projections on the belt being pivotally mounted and counterpoised whereby the projections will urge the carts to the discharge end of the housing and then release the carts whereby the carts will always be pushed to the discharge end of the housing regardless of how many carts there are in the housing.

5. The device as set forth in claim 4 wherein said means for discharging a coin includes a rotatable notched disc for engaging a handle of a grocery cart, electrically operated means for rotating the disc when a cart is pushed into the housing, cam operated means for discharging a coin, and a cam drivingly connected with the disc for causing discharge of a coin upon rotation of the disc, and means for stopping said disc with a notch positioned for receiving a handle of a subsequently inserted grocery cart.

6. The device as set forth in claim 5 wherein said coin operated means includes an electrically driven rotary disc energized in response to the deposit of a coin, and a pressure switch engageable by a cart to be dispensed, said switch being disposed in the path of movement of the cart and being closed only when a cart is in a position to be dispensed thereby assuring operation of the discharge disc only when there is a cart ready to be dispensed.

7. In a grocery cart storage and dispensing apparatus having housing means for receiving and nesting a plurality of grocery carts, a dispensing disc rotatably mounted at one end of the housing, and coin operated means for operating said dispensing disc for ejecting a grocery cart.

8. In a grocery cart storage and dispensing apparatus having housing means for receiving and nesting a plurality of grocery carts, a receiving disc rotatably mounted at one end of the housing, and means for rotating the disc thereby moving the cart into the housing, and means for discharging a coin in response to rotation of said disc.

References Cited by the Examiner

UNITED STATES PATENTS

| | | | |
|---|---|---|---|
| 773,335 | 3/03 | Talmage | 198—170 |
| 780,418 | 1/05 | Garlick et al. | 221—277 |
| 2,315,515 | 4/43 | Gibson et al. | 221—14 |
| 2,596,686 | 5/52 | Hess. | |
| 2,818,955 | 1/58 | Stackhouse | 194—4 |

SAMUEL F. COLEMAN, *Primary Examiner.*